United States Patent [19]

Eidenberg

[11] Patent Number: 4,709,846
[45] Date of Patent: Dec. 1, 1987

[54] APPARATUS FOR THE CONTINUOUS HOT TINNING OF PRINTED CIRCUIT BOARDS

[76] Inventor: Kaspar Eidenberg, Barbarastrasse 18, D-5241 Gebhardshain, Fed. Rep. of Germany

[21] Appl. No.: 915,741

[22] Filed: Oct. 6, 1986

[30] Foreign Application Priority Data

Oct. 11, 1985 [DE] Fed. Rep. of Germany ....... 3536304
Nov. 8, 1985 [DE] Fed. Rep. of Germany ....... 3539585
Dec. 23, 1985 [DE] Fed. Rep. of Germany ....... 3545933

[51] Int. Cl.⁴ .................................................. B23K 1/00
[52] U.S. Cl. .......................................... 228/34; 228/37
[58] Field of Search ...................... 228/34, 37, 40, 36, 228/38

[56] References Cited

U.S. PATENT DOCUMENTS

| | | | |
|---|---|---|---|
| 3,989,180 | 11/1976 | Tardoskegyi | 228/37 |
| 4,162,034 | 7/1979 | Pavlas | 228/37 |
| 4,171,761 | 10/1979 | Boldt et al. | 228/37 |
| 4,363,434 | 12/1982 | Flury | 228/37 |
| 4,437,605 | 3/1984 | Tucker et al. | 228/37 |
| 4,509,670 | 4/1985 | Cammarata | 228/34 |
| 4,523,708 | 6/1985 | Minchev et al. | 228/37 |

Primary Examiner—M. Jordan
Attorney, Agent, or Firm—Popper, Bobis & Jackson

[57] ABSTRACT

Apparatus for the continuous hot tinning of printed circuit boards includes conveying rollers for passing the circuit boards through the apparatus, and a trough for accommodating the molten tin, together with nozzles for applying tin from the trough to appropriate locations on the circuit boards. A hollow column is disposed at at least one side and preferably at both sides of the path of conveying movement of the circuit boards through the apparatus, with the open lower end of the or each column dipping into the trough so as to be below the level of the molten tin therein. Tin is pumped from the trough through the columns by pumps at the lower ends thereof, and then to the nozzles arranged above and below the path of conveying movement and directed so as to spray molten tin on to the printed circuit boards. In a process using the apparatus for soldering the connecting pins of components to a circuit board, molten tin from a trough is sprayed against the underside of the board at the appropriate locations.

34 Claims, 16 Drawing Figures

4,709,846

APPARATUS FOR THE CONTINUOUS HOT TINNING OF PRINTED CIRCUIT BOARDS

BACKGROUND OF THE INVENTION

The invention relates generally to an apparatus for continuous hot tinning of printed circuit boards, and a process for soldering the terminals of components to the conductor tracks and soldering eyes of a printed circuit board.

The manufacture of printed circuit boards or cards is increasingly changing over from using galvanic processes to a hot tinning process. In such a process, the copper conductor tracks which are already applied to an insulating base material or substrate are coated with a eutectic lead-tin layer.

For the sake of simplicity herein, reference is only made hereinafter to a tin layer and a hot tinning operation.

Hot tinning operations include a cyclic process which operates in a vertical mode and a continuous process which operates in a horizontal mode. In the cycline process, the printed circuit boards or cards are dipped into liquid tin. When the printed circuit boards are taken out of the tin, they are then passed between nozzles and hot air is blown thereonto, thereby blowing free the holes and bores in the board while also blowing away excess tin so as to make the layer of tin applied thereto move even and flat. On the other hand, in the horizontal-mode continuous process, the board is guided through a standing wave of solder or tin material which is produced in front of baffle plates of a nozzle out of which the molten tin is discharged. The printed circuit board is then passed between two nozzles and blown off using hot air.

Prior to the tinning operation, the printed circuit board is treated with a fluxing agent. However, a part of fluxing agent tends to remain clinging to the board and is thus carried into the tin. The fluxing agent burns in the hot tin, with the result that in a tin bath which is not stirred or agitated in some suitable fashion, the residues of the burnt fluxing agent float on the surface of the tin. By virtue of the continuous movement in which the bath is involved in the course of operation however, such residues are entrained with the tin and thus contaminate the surface of the circuit board. Such residues also have a tendency to clog the conduits, lines and pumps of the system. Finally, they also put the surfaces of the conveyor rollers used in the system under additional stress so that the conveyor roller surfaces tend to suffer from a high rate of wear. All that means that extensive cleaning and maintenance operations are required during each working shift involved in carrying out the hot tinning process.

Furthermore, as already indicated above, after the actual hot tinning operation, the printed circuit boards are blown off using hot air, and the fact that the air has to be suitably heated involves the consumption of a great deal of heat energy and thus increases operating costs.

To give a more detailed picture of the kind of equipment involved, reference may be made to U.S. Pat. No. 2,821,959 diclosing an apparatus for soldering components to a printed circuit board or card, comprising a printed circuit board heating station, a fluxing station, a hot tinning station, a cleaning station and a drying station, and further including conveyor rollers which are arranged horizontally above and below the path of conveying movement of the printed circuit boards, for engaging the printed circuit boards to convey them through the equipment. The apparatus further has a trough at the hot tinning station, for accommodating the molten tin, at least one nozzle for applying the tin to the copper conductor tracks on the printed circuit board, with a conduit between the trough and the nozzle, the conduit going upwardly beyond the plane of the nozzle. A pump is provided for conveying the tin from the trough through the conduit into the nozzle, while the tin in the trough is heated by suitable heating means.

SUMMARY OF THE INVENTION

An object of the present invention is to provide an apparatus for the hot tinning of printed circuit boards, which is such that the tin to be applied to the circuit boards is at least substantially free from impurities due to burnt fluxing agent residues.

Another object of the present invention is to provide a printed circuit board hot tinning apparatus which provides for a reduced level of expenditure in respect of maintenance and cleaning.

Still another object of the present invention is to provide a printed circuit board hot tinning apparatus which provides for a reduced level of energy costs.

A further object of the present invention is to provide a printed circuit board hot tinning apparatus adapted to provide for quick and easy application of tinning solder to the appropriate locations on a printed circuit board, in a contact-free manner.

A still further object of the present invention is to provide a process for soldering terminal means of components to a printed circuit board in a quick and easy operation, with the amount of tinning solder wastage being at least substantially reduced.

Yet a further object of the present invention is to provide a process for soldering terminal means of components to a printed circuit board in which the solder is applied to the board only at the respective locations thereon at which solder is required.

In accordance with the principles of the present invention, these and other objects are achieved by an apparatus for the continuous hot tinning of printed circuit boards, comprising a station for heating the printed circuit board, a fluxing station, a hot tinning station, a cleaning station and a drying station. Conveyor rollers are arranged horizontally above and below the path of transportation movement of the circuit boards through the apparatus, for engaging the circuit boards to convey same, while the hot tinning station includes a suitable container of a generally trough-like configuration to accommodate molten tin. The tin in the trough is suitably heated by associated heating means. Columns or pillars are arranged at both sides of the path of conveying movement of the printed circuit boards, in the trough, with the lower ends of the columns or pillars being open and dipping to a substantial depth into the trough and thus into the tin thereof. The upper ends of the columns or pillars are disposed above the path of transportation movement of the circuit boards through the apparatus, while nozzles are arranged above and below the path of transportation movement on both sides thereof and are directed theretowards to apply the tin solder to the circuit boards as they pass through the apparatus. The inlets of the nozzles are connected to the columns or pillars, in the plane of the path of transportation movement of the printed circuit boards.

In that arrangement, with the molten tin being continuously pumped around the system from the trough, through the columns or pillars and then through the nozzles, then dropping back into the trough, the tin is continuously moved around and thus agitated in the trough. As a result, burnt fluxing agent residues and other impurities, due to their low specific gravity, rise upwardly in the molten bath and thus collect at the surface thereof from where they flow away through an overflow means, without external intervention, in the normal course of operation of the equipment. In order to provide for further and more secure separation of tin material and impurities, the tin is drawn from the trough at a low point therein, and thus at a substantial distance below the surface of the tin at which the impurities are to be found, and is then pumped upwardly beyond the plane of the path of conveying movement of the printed circuit boards through the apparatus. From there the tin material flows downwardly to the applicator nozzles simple due to static pressure or the force of gravity acting thereon. That ensures that the tin material is applied to the conductor tracks or paths on the printed circuit board in a very uniform manner. A static pressure corresponding to a difference in height or pressure head of about 600 mm has been found to be sufficient.

It will be seen therefore that the columns or pillars are disposed in the circuit through which the molten tin passes, with the tin being pumped up in the columns or pillars by suitable pump means. At the same time, the collars or pillars form support members for carrying other components of the apparatus. From the columns, the molten tin flows into the nozzles under the above-indicated static pressure and is discharged therefrom in a uniform manner. The overflow arrangement which is provided in the upper region of the trough containing the molten tin ensures that any burnt fluxing agent residues and other impurities and contaminatory material which float on the surface of the molten bath can satisfactorily flow away and thus do not constitute a major problem by virtue of always being present in the bath. Such impurities are thus readily removed from the tin circuit of the apparatus and therefore are no longer in a position to clog fine passages and nozzles in the system. The amount of wear produced at the conveyor rollers for conveying the printed circuit boards through the apparatus is also reduced by virtue of the removal of such impurities from the tin circuit of the apparatus. The fact that such impurities are removed from the apparatus also means that the level of defects which occur in the application of the tin to the printed circuit boards, due to the presence of contaminatory material, is also reduced.

In an advantageous feature of the present invention, the nozzles are in the form of nozzle bars which extend at least substantially over the entire width of the path of conveying movement of the printed circuit boards, with the nozzle bars comprising a pipe at a central position and an annular space defined therearound, while the columns comprise two pipes which are disposed in mutually concentric relationship, the inner pipes being open at their lower ends and dipping into the trough containing the tin, with the annular spaces defined in the nozzle bars communicating with the inner pipes, while the space between the inner and outer pipes of each column or pillar is connected at its intake end to a hot oil source, while also being connected to the central pipes of the respective nozzle bars. That embodiment thus provides, in addition to the tin circuit, a hot oil circuit, wherein the hot oil flows through and around the columns or pillars and also passes through the nozzle bar. That arrangement therefore ensures that the tin is held at the desired temperature thereof throughout its circuit through the apparatus and in particular over the entire length of the nozzle bars where it is particularly important that the tin should remain in a suitably fluid condition.

Another advantageous embodiment of the apparatus of the invention provides that the nozzles have outlet openings for discharging hot air, downstream of the outlet openings for the tin, as considered in the direction of movement of the circuit boards through the apparatus. The hot air which issues from the nozzles is kept at substantially the same temperature as the tin. When the jets of hot air issuing from the outlet openings of the nozzles impinge on to the layer of tin which has just been applied to the respective printed circuit boards, that layer is rendered more uniform and even by virtue of the effect of the air. The preferred embodiment of this construction provides that the hot air issues from the same nozzle bars as the tin. Within the apparatus, the air is delivered in the vicinity of the tin and the hot oil circuits, with the air thus being heated to the desired temperature thereof. That means that there is not need to provide for particular heating of the air, thus further reducing the level of energy costs incurred.

A further embodiment of the apparatus of the invention provides that, in the feed conduits leading to the outlet openings for the tin, the nozzles each have a slider which is displaceable by the force of a spring means into the feed conduit, into a position of closing off that conduit, while the slider is displaceable out of the feed conduit into a position of opening same, by an electromagnetically operated actuator. That construction is thus so designed that in the rest position of the respective slider, the outlet openings for discharge of the tin from the nozzles are closed. The electromagnetically operated actuator must be brought into operation in order to move the respective sliders into the open position thereof, thereby to permit the tin to flow through the feed conduits and out of the respective nozzles.

Another embodiment of the invention provides that each of the nozzles comprises first and second half shell members which are held together by suitable screw members or bolts and which are recessesd on their mutually oppositely disposed sides to provide the respective annular spaces referred to above in each nozzle. Desirably, the nozzles are so arranged as to be displaceable about their respective longitudinal axis or with respect to the path of conveying movement of the circuit boards, whereby the apparatus can be readily adapted to different operating conditions.

Still another embodiment of the apparatus of the invention provides that the nozzles are subdivided over the length thereof into a plurality of nozzle portions. In an advantageous form of that construction, the nozzles are subdivided into a middle wide nozzle portion, with two outer narrow portions on respective sides thereof, as considered in the direction transverse with respect to the path of conveying movement of the printed circuit board through the apparatus. The above-mentioned sliders for controlling the feed of tin to the nozzles and the control means for controlling the discharge of hot air can be actuated separately for each of the nozzle portions. The middle wide nozzle portion is recommended to be around 300 mm in width while a width of 150 mm is recommended for each of the two outer narrower portions on respective sides of the middle portion. With that arrangement, printed circuit boards of various standard widths may be passed through the apparatus according to the invention individually or simultaneously.

It has already been noted above that the conveyor rollers of the apparatus tend to be subjected to a high level of mechanical loading. In addition, they are also subjected to a high level of thermal loading by virtue of coming into contact with the hot printed circuit boards. Hitherto, attempts have been made to deal with those loading on the conveyor rollers by virtue of the choice of suitable plastic materials for constituting the surface at least of the conveyor rollers. Embodiments of the apparatus of this invention provide that the rollers are subjected to a lower level of mechanical loading, because, as indicated above, impurities and contaminatory material are removed from the tin and thus do not reach the surfaces of the conveyor rollers, while in another preferred embodiment of the invention, in order to reduce the level of thermal loading on the rollers, the rollers for conveying the printed circuit boards through the apparatus have hollow shafts and the shafts are part of a coolant circuit.

Tests have shown that it is desirable for the circuit boards not to be passed through the apparatus in a precisely horizontal position. A slight angle of inclination or a fall in respect of the circuit boards of from example 3° relative to the horizontal in any direction has been found to be desirable. With the printed circuit boards inclined in that manner, any impurities which have still remained in the molten tin and which have been applied therewith to the printed circuit board flow away into one corner or an edge of the printed circuit board. A preferred embodiment of the invention provides that the inclined position of the printed circuit boards as they pass through the apparatus is achieved by the assembly comprising the conveyor rollers, nozzles and associated components being adjustable in respect of their angle of inclination transversely with respect to the path of conveying movement of the boards. A preferred embodiment also provides that the conveyor rollers are arranged along the path of conveying movement of the boards, at a slight angle of inclination.

Another embodiment of the invention provides that the columns or pillars are held in the trough containing the molten tin and the nozzles are held between the columns or pillars. Arranged below the nozzles is a plate arrangement acting as a catch means to catch molten tin which drops from the printed circuit board to which the tin has been applied, the catch means having a fall thereacross to provide for the accumulation of molten tin at a lowest part of the catch means. A drain pipe extends from the lowest part of the catch means and leads into the trough, to return the molten tin thereinto. A cover plate is disposed above the path of conveying movement to form an upward cover means thereover, while a further cover plate is disposed above the trough to provide a cover means above the trough. The above-mentioned drain pipe extends through the cover means above the trough, in any suitable fashion. The catch means is desirably of a funnel-like configuration, with the lowest part thereof substantially at its centre.

In order for the molten tin to be conveyed into the columns or pillars and then upwardly therein, and in order to provide that the tin is circulated in the tin circuit of the apparatus, another preferred embodiment of the invention provides that an electric motor is disposed on each column while mounted in each colum is a shaft whose upper end is coupled to the respective electric motor while a suitable pump member such as a pump wheel or impeller is carried at the lower end portion of each shaft. The pump member thus displaces molten tin from the trough and upwardly within the respective column or pillar.

In order to provide compensation for the tin which is removed from the circuit of the apparatus by virtue of tin being applied to the printed circuit boards, an embodiment of the apparatus of the invention provides that a piece of tin material, also as an anode, is suspended above the trough in such a way as to be displaceable in respect of height relative thereto, with the lower end of the piece of tin dipping into the molten tin in the trough. The fact that the piece of tin is in contact with the molten tin in the trough means that the piece of tin melts away at its lower end and thus provides a make-up feed of tin to the molten tin in the bath. The level of the tin bath in the trough is measured by suitable sensing means in such a way that, when the level of the tin bath in the trough falls below a given reference level, the piece of tin suspended above the trough is moved downwardly by a given amount to ensure that the trough has a continuous make-up feed of tin thereinto. The piece of tin thus again dips into the molten bath, melts away and thus raises the level of the bath to the desired value.

In the above-mentioned apparatus as disclosed in U.S. Pat. No. 2,821,959, after the hot tinning operation, compressed air is blown on to the printed circuit boards in a cleaning station. The blowing means used in that apparatus may be referred to as air blades, in that they cut away excess tin material. Thus, the compressed air which is blown on to the printed circuit boards is intended in particular to displace from holes and bores in the printed circuit board, any tin which has penetrated thereinto, as long as the tin is still hot and thus suitably soft and fluid. A preferred embodiment of the apparatus of the present invention provides that, in order to enhance the cleaning action, in the station for cleaning the printed circuit boards, the conveyor rollers are suspended or mounted by resilient mounting means, while a shaker means is operatively connected to the conveyor rollers. The shaker means is mounted by means springs and the conveyor rollers are carried in the shaker means. The shaking action imparted to the printed circuit boards by operation of the shaker means assists with removing the tin from the bores and holes in the printed circuit boards.

In addition, the operation of applying a fluxing agent to the printed circuit baords prior to the hot tining thereof often gives rise to the difficulty that the fluxing agent not only wets the walls of the bores and holes in the circuit board, but remains clinging therein. That results in the fluxing agent being introduced into the tin bath, which is an undesirable phenomenon, as already referred to above. In order to prevent that from happening, a further embodiment of the invention provides that disposed in the fluxing station, downstream of fluxing agent applicator means and above and below the path of conveying movement of the circuit boards, are nozzles which are directed on to the circuit boards, for blowing free the holes and bores which are to be found therein. The nozzles may be the same kind as those with which the hot tin is applied to the boards. The fluxing agent is thus applied to the boards through one outlet of the nozzles, while air is blown on to the boards through the other outlet opening thereof, as when the tin is applied thereto. Both the fluxing agent and the air may be suitably heated by means of the hot oil system.

It may be found that the nozzles do not cause the tin generally to be applied to the circuit boards in such a way as to form a layer of uniform thickness thereon. On the contrary, there are raised portions, portions of increased thickness and so forth in the layer of tin which is produced in that way. Accordingly, it is desirable for the layer of tin on the circuit board to be rendered more uniform or levelled off. For that purpose, a previous process provides that the circuit boards are passed through a wave of hot oil which is discharged under pressure through a nozzle formed from baffle plates. That gives rise to oil vapours or mist, in particular when there is no circuit board passing through that arrangement. It is not really possible to retain the oil mist produced in those circumstances, with the result that it penetrates into the environment, with potentially harmful consequences. Now, in a preferred embodiment of the invention, for the purposes of levelling off the layer of tin applied to the circuit board without causing environmental pollution of the kind indicated above, while at the same time recycling the oil in the apparatus, disposed downstream of the nozzles for applying the tin to the circuit boards, in the direction of movement of the latter through the apparatus, and above and below the path of their conveying movement, are nozzles for spraying hot oil and nozzles for blowing air at a lower temperature, on to the circuit boards. The nozzles cause oil to be sprayed on to the circuit boards at a temperature in the region of around 220° C., in a restricted or limited jet or stream. The pressure involved in such an arrangement is substantially higher than in an oil wave, so that the layer of tin on the circuit board is satisfactorily levelled while using a smaller volume of oil. The levelling action with that arrangement occurs uniformly on the top side and the under side of the respective circuit boards. The tin on the circuit boards is cooled down and caused to set by the air which is then blown on to the circuit boards, at a lower temperature. The conveyor rollers which subsequently engage the circuit boards to convey them on through the apparatus do not then cause grooves, channels and the like to be impressed into the tin as the tin is already sufficiently hard to withstand that effect. Instead of the lower-temperature air referred to above, it is also possible to blow cooler oil on to the circuit boards.

The nozzles are advantageously disposed in the above-mentioned shaker means. In that arrangement, they should be supplied with oil and/or air intermittently only when a circuit board is moving therepast. That ensures that oil is not unnecessarily discharged from the nozzles, which could cause further environmental pollution. Instead of using a respective pair of nozzles for the discharge of oil and air respectively, it is also possible to provide more than one pair of nozzles for each of the oil and air discharge functions.

It should further be mentioned herein that the fluxing station may use the same nozzles or nozzle bars, as are used for applying the layer of tin. The nozzles are advantageously heated in order to ensure that the fluxing agent is of the correct viscosity.

Where, as indicated above, the apparatus is also to be used in an operation for soldering components to the conductor tracks or paths or soldering eyes or pads of printed circuit boards, it is desirable for the nozzles to be rotatable about their respective longitudinal axes. For the same purpose, another embodiment of the apparatus provides that the nozzles are fixed only to one column or pillar, and the latter is pivotable about its vertical axis, being operatively connected for that purpose to a pivoting mechanism.

Now one of the last steps involved in the industrial production of printed circuit boards lies in electrically connecting the connections or terminals of the components involved, to the conductor tracks or paths and soldering eyes or pads of the boards. Machine-operated soldering processes have been used for that purpose, one form of such a process which is frequently employed being a drag soldering process while another form of the process is a wave soldering process. In the drag soldering process, the circuit board is pulled or dragged over the surface of the liquid solder material, the solder thus coming into contact with the members which are to be soldered together and also the entire underside of the circuit board. In the wave soldering process, the liquid solder is pumped into a nozzle by a suitable pump, with the outlet opening of the nozzle being disposed above the level of the solder in the trough. The liquid solder issues from the nozzle in the form of a wave and flows back into the trough. The circuit board is passed with its underside over that wave and the members which are to be soldered together pick up solder and are thus suitably joined to each other. In addition, the solder contacts the entire underside of the circuit board. It will be seen therefore that in both those forms of process, the undersides of the circuit boards are in contact with the hot solder, over a very substantial area. The result of that is that the circuit boards and also the components thereon are heated up and subjected to a thermal loading, which can cause major difficulties in relation to sensitive components. Another point in common to the two forms of the process set forth above is that the trough must provide a large free surface area occupied by liquid solder. Hot gases and vapours are there formed from fluxing agent residues, impurities and other materials. As it is very difficult to catch such hot vapours and gases, they can cause serious environmental pollution in the area of the apparatus.

Thus, in another aspect of the invention, there is provided a process for soldering terminal or connecting means of components to conductor tracks and soldering eyes or pads of a printed circuit board which is provided with the components on one or both sides thereof. In that process, the solder is contained in a molten state in a container trough, with the circuit boards being passed over the trough. Liquid solder is then sprayed against the underside of the circuit boards. Desirably, the liquid solder is sprayed against the underside of the circuit boards cyclically when a location thereon to be soldered moves past the point of liquid solder spray. While the hot liquid solder in the above-mentioned wave soldering process is in contact with the underside of the circuit board, as considered in the direction of conveying movement thereof, over a length of about 10 cm, and in the drag soldering process, the underside of the circuit baord is in contact with the hot solder over its entire length, the above-indicated process of the invention provides that contact between the circuit board and the solder is restricted to a length of only about 1 cm. The solder thus impinges in the form of a jet on to the underside of the circuit boards. In the direction of conveying movement of the board, the jet is of a length of around 1 or only a few milimeters. After impinging on the board, it divides up towards both sides, and flow or creeps a few millimeters under the circuit board, whereupon excess solder drips off. The amount of contact is thus restricted to an overall length of only about 10 millimeters. That accordingly provides that the resulting thermal loading on the circuit board and the components thereon is comparatively low so that even sensitive components can be soldered to the circuit board in that way, by a machine-operated process. In accordance with a preferred embodiment of the process, the solder can be sprayed against the underside of the circuit board at different angles at different locations. In that way it is also possible for surface mounted devices (known as SMD) to be soldered to the board by a machine process. Such devices are large components which bear with an entire side against the circuit boards and whose ends are partially metallised. The process of the invention now provides that the solder is directed in the form of a jet precisely on to the line of contact between the circuit board or a conductor track or path thereon, and the metallisation of the device in question. In that way, solder is applied only where it is acutally required, thus reducing the level of thermal loading to a negligible amount.

Spraying is an operation which is easy to control from a mechanical point of view, in that the amount of solder, the tine, the duration, the strength, the angle involved and other such parameters can be accurately controlled. There is thus no longer any need for the circuit board to be brought into contact with the liquid solder, over the entire surface of the board, insofar as soldering is required only at a number of separate locations on the board. Thus, in comparison with the above-indicated dragsoldering and wave soldering processes, the amount of solder which has to be pumped around the system used, and the amount of energy required for heating up the solder, and other factors involved in the operation, are thus reduced. There is also no need for the hot solder to be in contact with air over the entire surface of the trough containing same, and gases, vapours and the like which are produced over the large surface area of the trough in the above-indicated dragsoldering and wave soldering processes are no longer produced to cause atmospheric environmental pollution. As mentioned, the thermal loading on the circuit board and the components thereon is also reduced.

In horizontal section, the above-mentioned components are generally square or rectangular. Frequently they are applied to the circuit boards in such a way that their edges extend at least substantially parallel to the edges of the board. A jet of liquid solder which is sprayed in parallel relationship to the line of contact which is thus formed between the circuit board or a conductor track thereon, and the metallisation on the component to be soldered to the circuit board, thus impinges precisely on that line of contact, where the metallisation on the component in question is then soldered to the conductor track or path. It may however also happen that the surface mounted devices are fitted to the circuit board at an angle. In that case the jet of solder intersects the line of contact between the device and the circuit board, at an acute angle. The metallisation of the device is only connected to the conductor track or path, by a solder spot, and dead areas are thus formed.

Accordingly, a preferred embodiment of the process of the invention provides that the soldering operation is to be such that, even when the lines of contact between the metallisation on the device or component to be mounted on the circuit board, and the circuit board itself, extend at an acute angle with respect to the direction of movement of the circuit board, the metallisation is soldered to a respective conductor track, along the entire line of contact between the metallisation and that conductor track. In that embodiment of the process therefore the liquid solder is sprayed against the underside of the respective circuit board, at an angle which periodically alters with respect to the direction of movement of the circuit board. In that embodiment, the angle is to alter periodically in a range of from about −45° to about +45°, with the line representing 0° extending at an angle of 90° to the direction of movement of the circuit board. The angle advantageously alters at a rate of from about 5 to about 20 oscillations per minute. With the spray jet of solder producing a reciprocating movement in that way about a vertical axis, the jet of solder impinges on the underside of a circuit board and thus the line of contact between the metallisation on a component or a device and a conductor track or path, from a different direction from one moment to the next, on a periodic basis. That therefore ensures that even lines of contact which extend at an acute angle with respect to the direction of movement of the circuit boards are encountered by the spray jet or solder, over their entire length, thus giving the desired complete and total soldering connection between the metallisation and the respective conductor track or path.

Further objects, features and advantages of the invention will be apparent from the following description of preferred embodiments.

DESCRIPTION OF PREFERRED EMBODIMENTS

Figure 1:
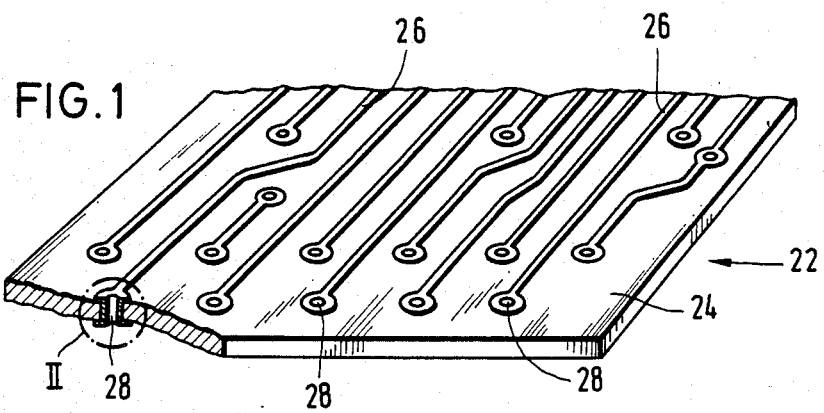
FIG. 1 is a perspective view of part of a printed circuit board.

Referring now to the drawings, FIG. 1 generally shows a printed circuit board or card as indicated at 22. It substantially comprises the base material or substrate 24 and copper conductor tracks or paths 26 which are provided thereon. The conductor tracks 26 were produced on the substrate material 24 by means on any suitable process. The conductor tracks 26 are to be hot-tinned by means of the hot tinning apparatus and process described hereinafter.

Figures 2, 3:
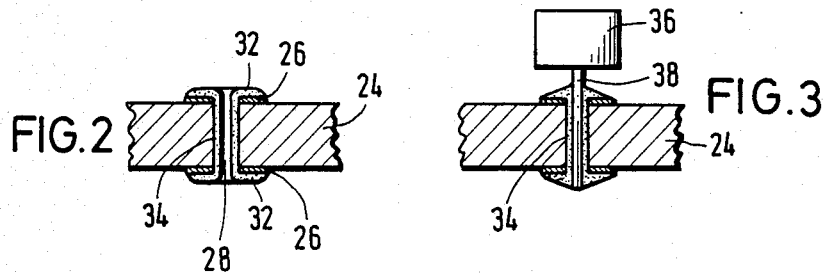
FIG. 2 is a view in cross-section of part of the printed circuit board of FIG. 1, showing the area within the circle II in FIG. 1.
FIG. 3 is a view similar to that shown in FIG. 2, after the fitting and soldering of an electrical component or device.

In general, as shown on an enlarged scale in FIG. 2, the conductor tracks 26 are disposed on the top side and the underside of the substrate material 24. Holes 28 are provided, which extend through the circuit board. In the view shown in FIG. 2, it will be seen that the walls of the holes 28 also have a copper coating thereon, which can also be hot tinned, as will be described hereinafter, thereby providing at the wall of the hole 28 the solderable feed-through contacting means as indicated at 34. As shown in FIG. 3, a component or device 36 has its connecting or terminal pin 38 fitted into the contacting means 34. The application of tin in that area facilitates the step of soldering the pin 38 in position in a subsequent working operation.

Figure 4:
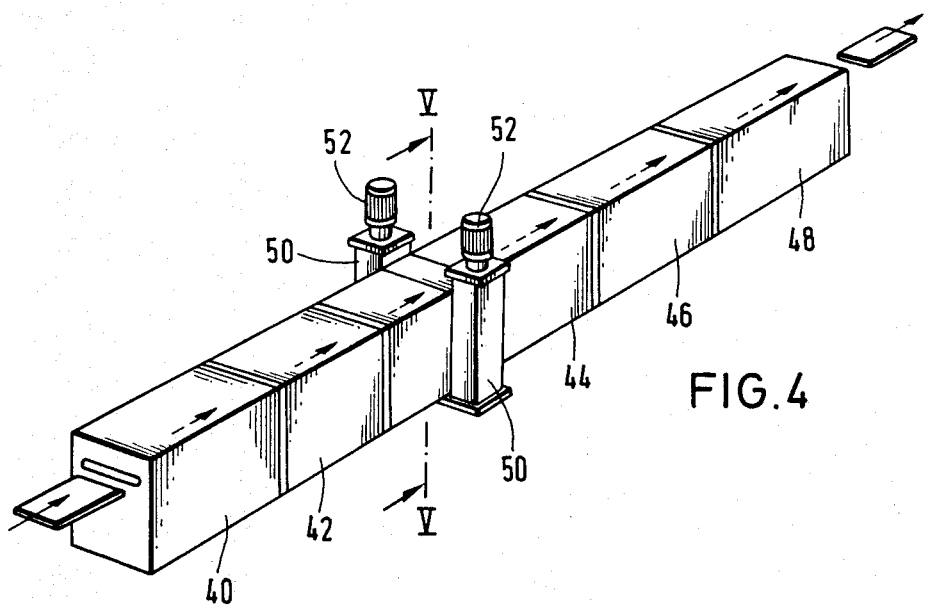
FIG. 4 is a simplified perspective view of a hot tinning apparatus with the various stations for processing the printed circuit boards.

Referring to FIG. 4, shown in diagrammatic perspective view therein are the various stations of the apparatus, through which a printed circuit board passes in a hot tinning operation. More particularly, the stations involved are a heating station 40, a fluxing station 42, a station 44 for hot tinning and levelling of the applied layer of tin, a cleaning station 46 and a drying station 48 for drying the printed circuit boards. As shown in FIG. 4, disposed on respective sides of the station 44 are first and second pillars or columns 50, referred to generally hereinafter as columns 50. Fitted on the columns 50 on the upper ends thereof are resepctive electric motors 52.

Figure 5:
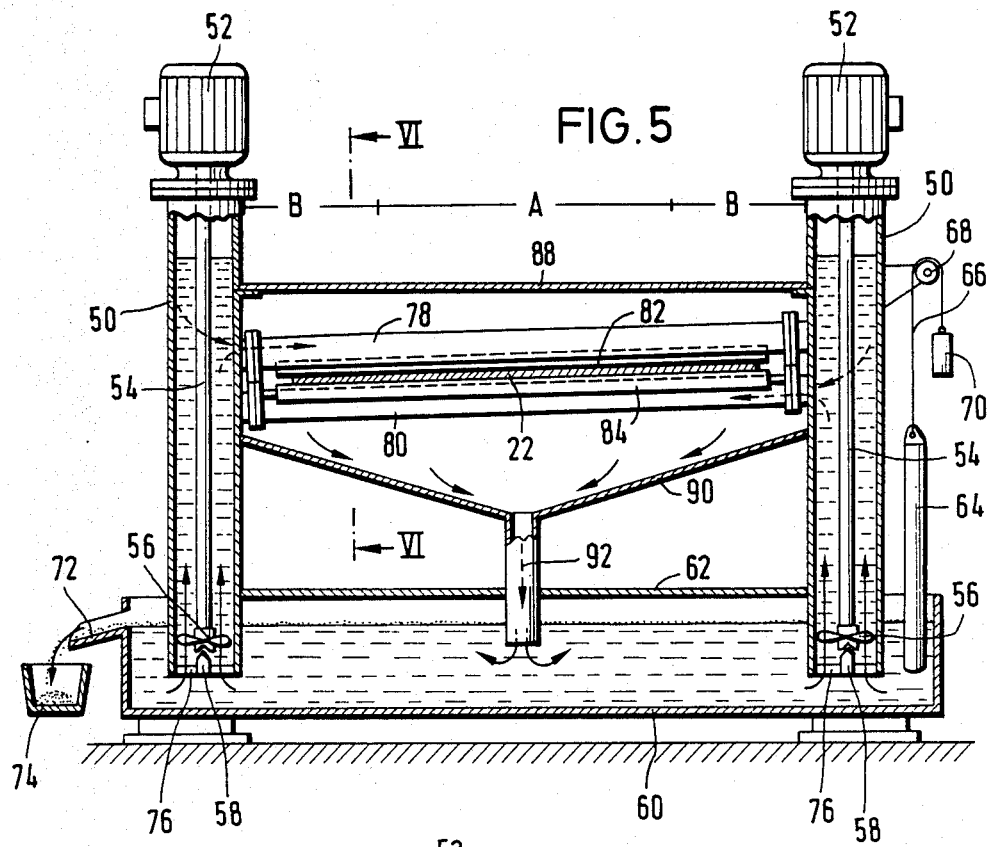
FIG. 5 is a partly sectional front view of the apparatus according to the invention.

Looking now at FIG. 5, it will be seen therefrom that the motore 52 are operatively connected to upper end portions of repective shafts 54 for driving them in rotation. The shafts 54 are disposed within the columns 50 and in turn carry pump members as indicated at 56, in the form of pump wheels or impellers. The shafts 54 are suitable mounted on bearings 58.

As can be seen clearly from FIG. 5, the entire hot tinning assembly stands in a container in the form of a trough 60. The trough 60 is filled with molten tin. For that purpose, tin is put into and held in a molten condition by suitable heating means which are not shown in FIG. 5. Disposed at the top of the trough 60 is a cover plate 62 which thus closes off at least the central part of the trough 60, in an upward direction, to prevent impurities and other contaminatory material from passing into the trough 60, while also reducing the risk of an accident. At a location at which the cover plate 62 is apertured, at the right-hand side of the trough 60 in FIG. 5, a piece of tin 64 projects into the trough 60 and thus dips into the molten tin material in the tin 60. The piece of tin 64 is suspended on a cable 66 in such a way as to be displaceable in respect of height relative to the surface of the molten tin in the trough 60. Thus, the cable 66 passes over a guide roller 68, while a weight 70 is connected to the end of the cable 66, to provide compensation for the weight of the piece of tin 64. The assembly further includes sensing means and control means (not shown) which are operative in such a way that the piece of tin 64 is progressively lowered into the trough 60 to ensure that the level of the tin material in the trough 60 remains at least approximately the same. Thus, the lower end of the piece of tin 64 dips into the molten tin in the trough 60 and, as the tin in the trough 60 is consumed by being applied to printed circuit boards, as will be described in greater detail hereinafter, the piece of tin 64 melts and thus makes up the level of the tin in the trough 60. As the tin in the trough 60 is consumed, the piece of tin 64 is progressively lowered to maintain the lower end portion thereof in the tin in the trough 60.

In the upper region, the trough 60 also has an overflow pipe as indicated at 72 at the left-hand side in FIG. 5. Disposed below the discharge end of the overflow pipe 72 is a collecting container 74, for receiving impurities and like material which overflows from the surface of the tin in the trough 60.

The columns 50 are open at their lower ends and at that location thus provide inlet openings as indicated at 76. As indicated by the arrows in FIG. 5, the molten tin is pumped from the trough 60 through the inlet openings 76 and into the columns 50 and then upwardly through the columns 50, by the pump members 56.

The two columns 50 are connected together by feed pipes 78 and 80 which extend generally parallel to each other, as can be seen from the view in FIG. 5, and which are disposed in at least approximately superposed relationship, when considered in cross-section. The molten tin which is pumped up in the columns 50 passes into the respective feed pipes 78 and 80, in the direction indicated by the broken-line arrows in FIG. 5. Thus, tin in the column 50 at the right-hand side of FIG. 5 passes into the lower pipe 80 while tin in the left-hand column 50 in FIG. 5 passes into the upper pipe 78.

Figure 6:
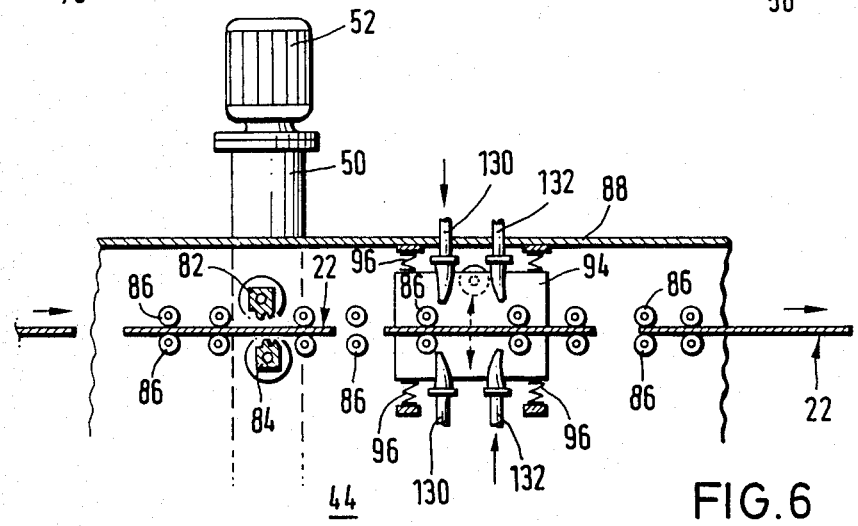
FIG. 6 is a partly sectional side view of part of the apparatus shown in FIG. 5, viewing in the direction indicated at line VI—VI in FIG. 5.

From the pipes 78 and 80, the tin passes into nozzles in the form of respective nozzle bars 82 and 84. As shown in FIG. 5, and also clearly visibly in FIG. 6, the nozzle bars 82 and 84 are disposed respectively above and below the path of conveying movement of the circuit boards 28 through the apparatus. As shown in FIG. 6, conveyor rollers 86 are likewise disposed respectively above and below the path of conveying movement.

Disposed above the assembly consisting of the pipes 78 and 80, the nozzle bars 82 and 84 and the conveyor rollers 86 is an upper cover plate 88 which thus closes the apparatus in an upward direction.

Referring still to FIG. 5, disposed beneath the path of conveying movement of the circuit boards is a plate arrangement 90 of generally hopper or funnel-like configuration, thus forming a catch means for catching tin which drips from the printed circuit board 22 being conveyed between the nozzle bars 82 and 84. The lowest part of the plate arrangement 90 is disposed substantially at the centre thereof, and one or more drain pipes of which one is indicated at 92 in FIG. 5 communicated with the above-mentioned lowest part of the catch plate arrangement 90. Thus, excess tin which has dripped from the printed circuit board 22 flows back into the trough 60.

FIG. 6 also shows a shaker device 94 in the hot tinning station. The shaker device 94 is mounted on springs indicated diagrammatically in the form of coil springs at 96. The shaker device 94 is caused to oscillate at a suitable rate by way of an unbalance means (not shown). The oscillatory movement is thus transmitted to the conveying rollers 86 which are carried by the shaker device 94 and by means of same to the circuit board 22 which is just passing through the shaker device 94. Also disposed at that location are suitable means for levelling the layer of tin applied to the circuit board, as will be described in greater detail hereinafter.

Figure 7:
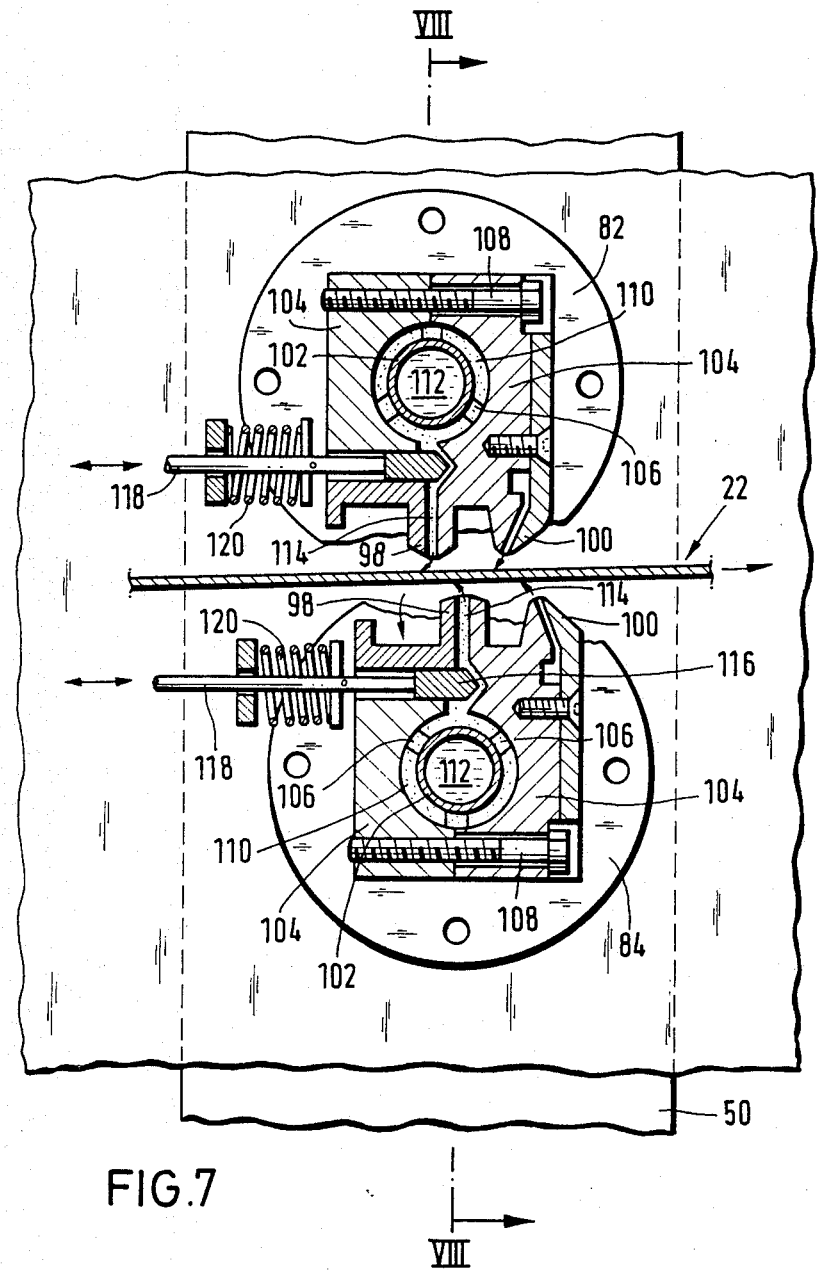
FIG. 7 is a view on a large scale and in cross-section through the two nozzle bars which are arranged respectively above and below the path of conveying movement of the printed circuit boards.
Figure 8:
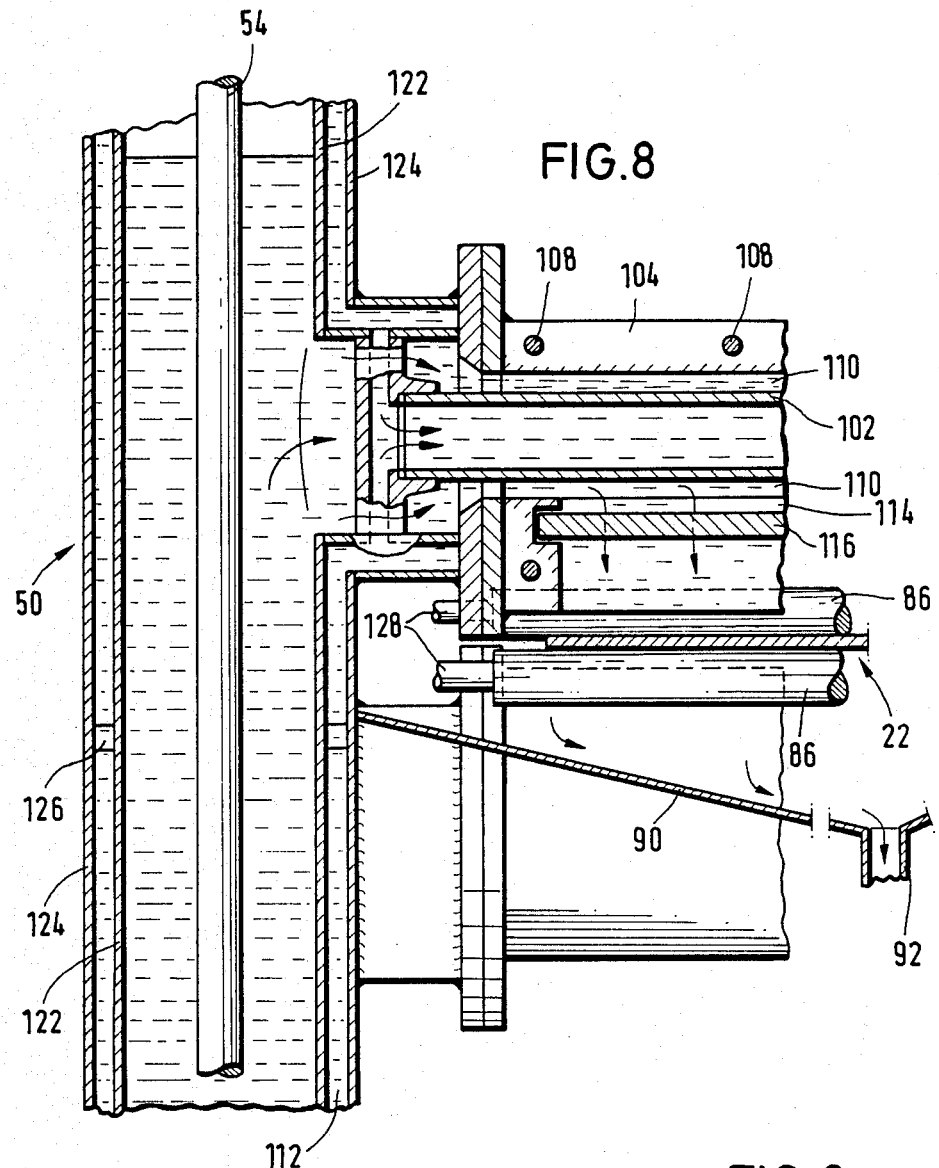
FIG. 8 is a view of part of the apparatus shown in FIG. 7, partly in section taken along line VIII—VIII in FIG. 7.

Reference will now be made to FIG. 7 showing the structure of the nozzle bars, and FIG. 8 showing the connection thereof to the tin circuit and to a hot oil circuit. Both of the nozzle bars 82 and 84 each have two outlet openings 98 and 100. Tin is discharged through the outlet openings 98 while hot air is discharged through the outlet openings 100. The outlet openings 100 for the hot air are disposed downstream of the outlet openings 98 for the tin, in the direction of movement of the circuit board 22, as indicated by the arrow associated therewith at the right in FIG. 7.

It will be seen from FIG. 7 that each nozzle bar which extends over at least substantially the entire width of the path of conveying movement, as can be seen from FIG. 5, includes a pipe 102 at a central position therein. Each nozzle bar essentially comprises first and second half shell members as indicated at 104 which are recessed with a recess of semicircular configuration in cross-section, on their mutually oppositely disposed inward sides. At the surfaces of the recesses, the members 104 have supports 106 for supporting the respective pipe 102 in the recess defined by the connected half shell members 104.

Reference numeral 108 in FIG. 7 denotes screw members or bolts for holding the two half shell members 104 together. Reference 110 in FIG. 7 denotes an annular space which is defined between the central pipe 102 and the surfaces of the recess defined by the half shell members 104 therearound. The hot tin is supplied by way of the annular space 110, while the pipes 102 are disposed in the circuit for a flow of hot oil, as indicated at 112. The hot tin issues from the annular space 110 into feed conduits 114 and from there into the outlet openings 98 of the respective nozzles.

Reference 116 in FIG. 7 denotes sliders which are disposed in the respective feed conduits 114. The sliders 116 are movably guided on actuating rods 118 which are connected to electromagnetically operated actuators (not shown). Springs 120 engage the rods 118 and are so arranged as to urge the sliders 116 into a position of closing the respective feed conduit 114. Thus, in the event of failure of the electrical system, the electromagnetically operated actuators are inoperative and the sliders 116 are held in position of closing off the feed of tin to the respective nozzles and their outlet openings 98.

Referring now to FIG. 8, it will be seen therefrom that each of the columns 50 is formed by an inner pipe 122 and an outer pipe 124 which is disposed in at least substantially coaxial relationship therewith, thereby defining an annular space therebetween. The two pipes 112 and 124 are connected together and suitably held in position by supports 126. The inner pipe 122 forms part of the circuit for the hot tin while the annular space between the pipes 122 and 124 is part of the circuit for the hot oil as indicated at 112 in FIG. 7. The hot tin issues from the inner pipe 122 into the annular space 110 in the respective nozzle bar assembly (see FIG. 7), in the direction indicated by the arrows in FIG. 8. From the annular space 110, the hot tin passes into the feed conduit 114 with the slider 116 therein. When the slider 116 is in the open position, the tin then issues from the nozzle opening.

The hot oil 112 issues from the annular space between the inner and outer pipes 122 and 124 of the respective column 50 and flows into the pipe 102. In that way, both the nozzle bars 82 and 84, and therewith also the tin, are held at a desired uniform temperature, over the entire width of the arrangement.

Figure 9:
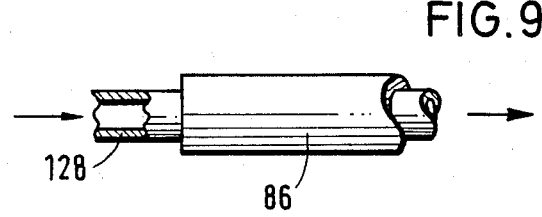
FIG. 9 is a view of part of a conveyor roller, showing the coolant passage passing therethrough.

Reference will now be made to FIG. 9 showing that the conveyor rollers 86 are each carried on a respective hollow shaft 128, with the hollow shafts 128 being part of a coolant circuit, with the flow of coolant through the hollow shaft 128 being indicated by the arrows in FIG. 9.

Reference will now be made again to FIG. 6 in relation to the shaker device 94 and the above-mentioned means for leveling off the applied layer of tin on the circuit board. Such means essentially comprise nozzle 130 and 132 which are disposed in mutually opposite relationship, above and below the path of conveying movement of the circuit boards 22, and directed thereonto. The nozzles 130 are disposed upstream of the nozzles 132, in the direction of movement of the circuit boards 22. The nozzles 130 are of a bent or curved configuration with their outlet openings being directed somewhat in the opposite direction to the direction of movement of the circuit boards 22, while the nozzles 132 are of such a configuration that their outlet openings are directed somewhat in the direction of movement of the circuit boards 22. Hot oil is ejected under pressure through the nozzles 130, and cooler oil or air is ejected through the nozzles 132. The hot oil is at a temperature of around 220° C. and the cooler oil is at a temperature of around 150° to 160° C. The applied layer of tin which can still be moulded or shaped is levelled off or rendered uniform by the action of the hot oil. The tin is cooled down and thus caused to set by the cooler oil which is discharged from the nozzles 132 under pressure, or the air which is similarly discharged from those nozzles. That therefore ensures that the conveyor rollers 86 do not form depressions or grooves in the surface of the tin, as the tinned circuit board passes on through the apparatus. The number of nozzles is not limited to the illustrated number of four nozzles, and it is possible to use more and, rarely, fewer nozzles. It is also possible to adopt constructions in which oil is discharged from more than one pair of nozzles and air is discharged from a further pair of nozzles. In all the embodiments, the oil should not be supplied on a constant or steady basis, but intermittently only when a circuit board is passing through the relevant station. For that purpose, the feed conduits leading to the nozzles include for example electromagnetically operated valves which are controlled by sensors disposed on the path of conveying movement of the circuit boards.

Figure 10:
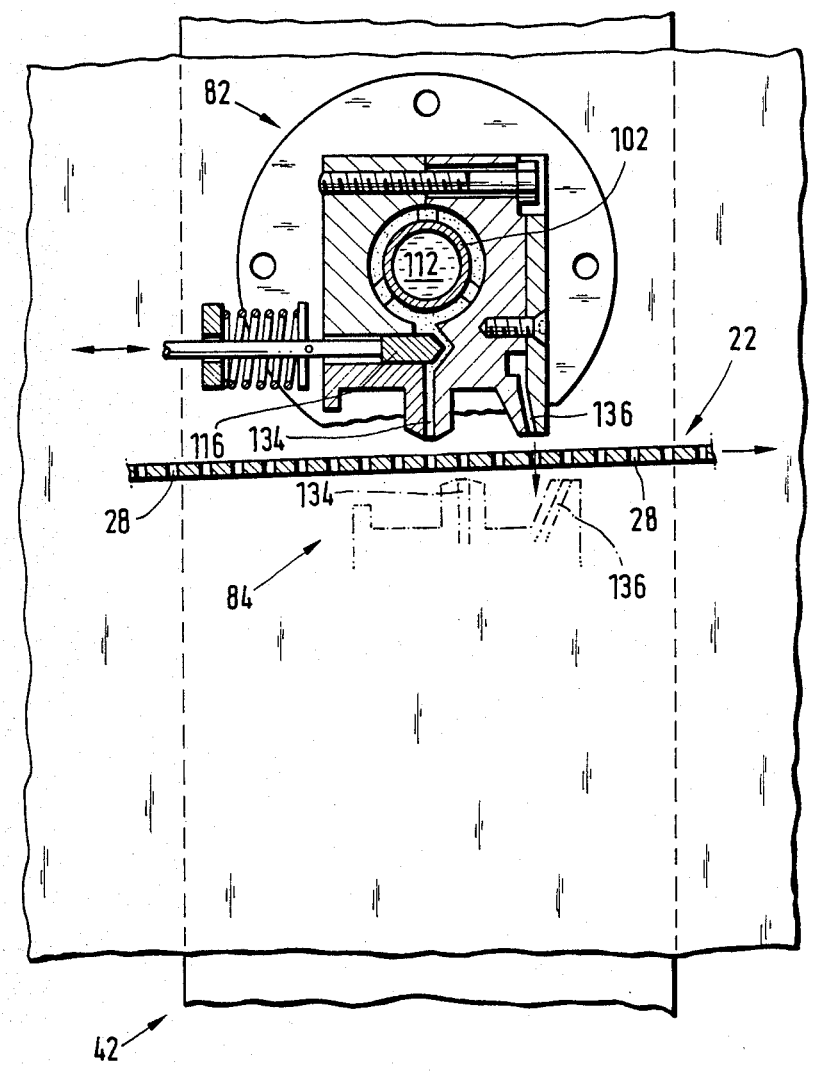
FIG. 10 is a simplified diagrammatic view of a fluxing station.
Figure 11:
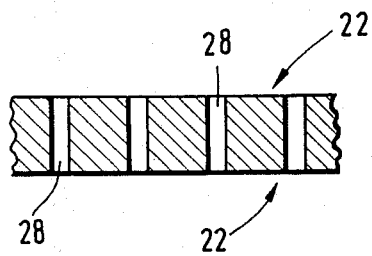
FIG. 11 is a view on an enlarged scale and in cross-section of part of a printed circuit board after passing through the station shown in FIG. 10.

FIG. 4 shows a diagrammatic view of the fluxing station for applying a fluxing agent to the circuit board. Referring now to FIG. 10, for that purpose the fluxing station 42 has nozzle bars 82 and 84, as were already described in relation to the operation of applying the tin to the circuit board. The nozzle bars 82 and 84 now have outlet openings 134 for the fluxing agent and outlet openings 136 for compressed air. The fluxing agent is heated by the hot oil 112 which passes through the pipe 102. The slider 116 which is operative in relation to the feed conduit leadinf to the outlet opening 134 controls the feed flow of fluxing agent through the nozzle. When the slider 116 is in an open condition, the fluxing agent is discharged from the respective outlet openings 134 under pressure and uniformly wets the circuit boards 22 on the top and undersides thereof. As regards the holes 28, not only are they wetted, but the holes are also in part completely filled with fluxing agent. FIG. 11 shows the configuration of the circuit board 22 with holes 28. That means that an excess amount of fluxing agent would be entrained into the station 42 and the tin bath. In order to prevent that from happening, the circuit boards 22 are blown off by means of compressed air discharged from the outlet openings 136, thus cleaning the fluxing agent from the holes 28.

The individual stations of the apparatus having been described, the movement of the circuit boards 22 through the entire apparatus can now be described. The circuit boards 22 pass successively through the stations shown in FIG. 4, for heating, fluxing, hot tinning, levelling, cleaning and drying the circuit boards. The movement of the circuit boards through the fluxing station 42 is shown in FIG. 10, where the circuit boards 22 are wetted with fluxing agent on their top side and their underside respectively, by means of suitable nozzles. The fluxing agent which initially completely fills the holes 28 in the circuit boards 22 is blown away by compressed air from the outlet openings 136, as indicated above.

The circuit boards then pass through the hot tinning and levelling station shown in FIGS. 5, 6, 7 and 8. In that station, as indicated above, the molten tin is pumped from the trough 60 up into the columns 50. From the columns 50 the tin passes into the annular spaces 110 in the nozzle bars (see FIG. 7), under the action of the force of gravity and thus under a constant static pressure. The presence of a circuit board 22 passing through the station is detected by a sensor. The sliders 116 are then drawn into the open position so that the tin issues from the outlet openings 98 and is deposited on the copper conductor tracks on both sides of the circuit board 22. The compressed air issuing from the outlet openings 100 provides for a first operation of levelling the applied tin on the circuit board, or making the layer of tin thereon more uniform. The hot oil which passes through the pipes 102 (see FIG. 7) holds both the tin and the air at the appropriate desired temperature.

Excess tin on the circuit board runs off to the side and rearwardly, and drips down from the circuit board, to be caught by the plate arrangement 90 in FIG. 5. FIG. 5 also shows that the assembly consisting of the nozzle bars 82 and 84 and the conveyor rollers is in an inclined position in the view shown in FIG. 5, which thus promotes the draining flow of tin towards the side of the respective circuit board. FIG. 7 shows that the circuit board 22 moves along a path which is inclined downwardly towards the rear of the respective circuit board 22, which thus promotes the flow of excess tin towards the rear of the respective board 22. Thus, the path of conveying movement of the circuit boards 22 does not extend horizontally but somewhat upwardly towards the right in FIG. 7.

When the tin has dripped on to the funnel-shaped plate arrangment 90 to be caught thereon, it flows to the lowest part thereof and then into the drain pipe 92 from which it flows back into the trough 60. Fluxing agent residues and other impurities in the trough 60 float to the top of the molten bath in the trough 60 and then pass into the overflow pipe 72 and by way thereof into the container 74.

The tin-spraying nozzle bars 82 and 84 shown in FIG. 5 are illustrated at the left in FIG. 6. After the circuit board 22 has passed through between the nozzle bars 82 and 84, it is advanced into the shaker device 94 which, as indicated above, is set shaking or oscillating by suitable means (not shown). Tin which has penetrated into the holes 28 in the circuit board 22 is removed therefrom, by virtue of the oscillating movement. The applied tin on the circuit board 22 is levelled or rendered uniform by the hot oil which issues under pressure from the nozzles 130, thus removing raised locations and the like. The tin on the circuit board is then cooled by the cooler air issuing from the nozzles 132. As it cools, the tin becomes so hard that, as mentioned, the conveyor rollers 86 do not leave any grooves, depressions or the like in the tin on the circuit board 22, as the circuit board continues to move through the apparatus.

Instead of two nozzles 130 and 132 respectively, it is also possible to use more nozzles, and likewise a pair of nozzles may also be omitted.

Figure 12:
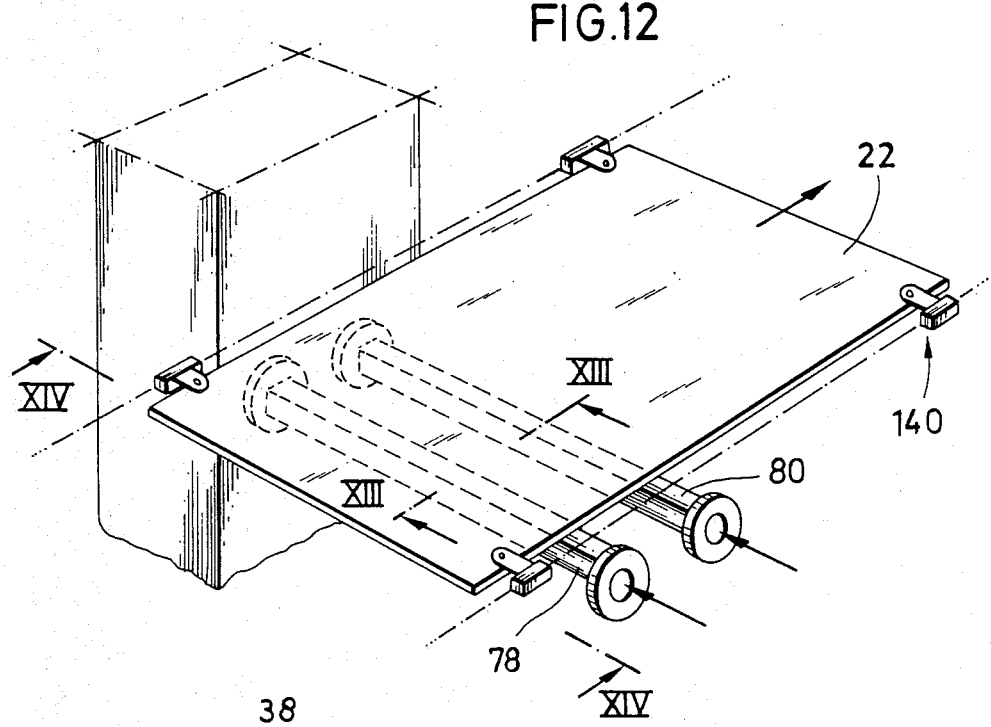
FIG. 12 is a simplified diagrammatic perspective view of the apparatus when used for soldering components or devices to a printed circuit board.
Figure 13:
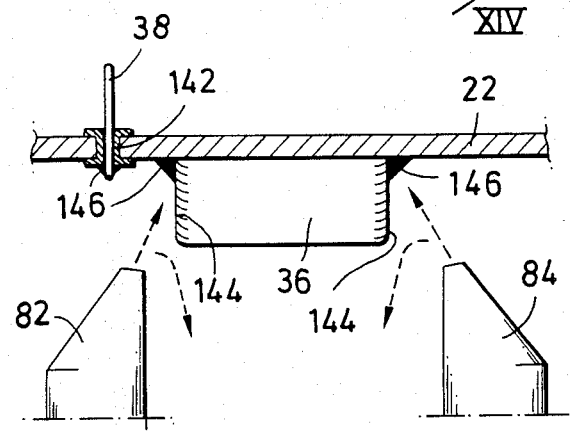
FIG. 13 is a diagrammatic side view partly in section taken along line XIII—XIII in FIG. 12.
Figure 16:
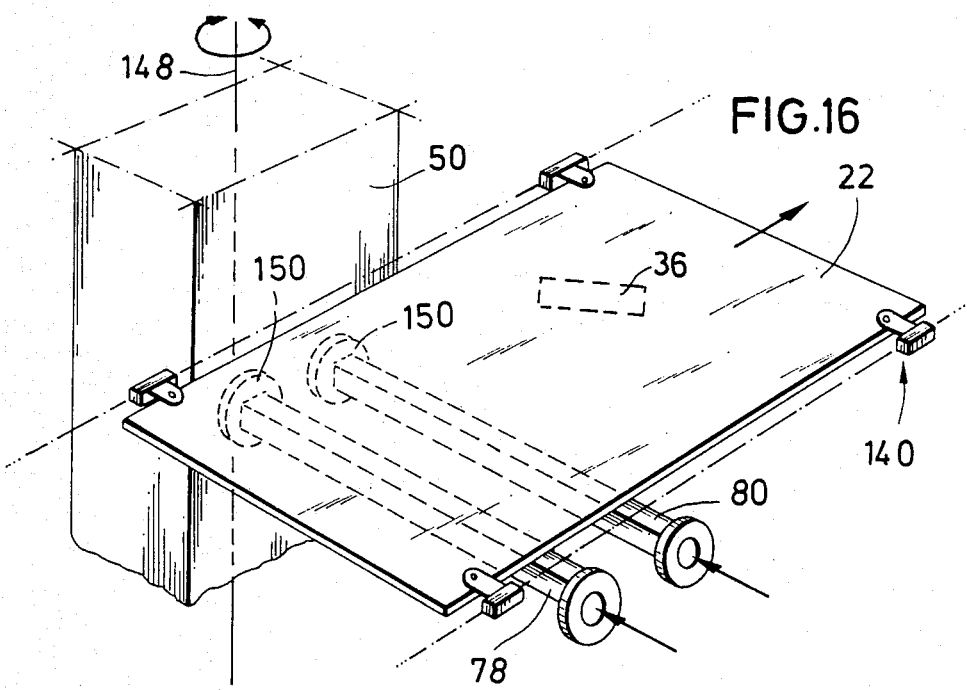
FIG. 16 is a view corresponding to that shown in FIG. 12, but diagrammatically illustrating the pivotability of the column or pillar.

Reference will now be made to FIGS. 12 through 16 to describe the way in which the above-described apparatus can be used for soldering devices and components to the conductor tracks and soldering eyes of circuit boards. In FIGS. 12 and 13, reference numeral 22 again denotes a circuit board which, as indicated by the arrows in FIG. 12 and in FIG. 16, is advanced through the apparatus by a conveyor arrangement diagrammatically indicated at 140. Reference numeral 142 in FIG. 13 denotes a soldering eye or pad, through which is passed the terminal or connecting pin 38 of an electronic component or device (not shown in FIG. 13 but corresponding to the device 36 shown in FIG. 3). The component or device is disposed on the top side of the circuit board 22 while disposed on the underside thereof is a further device 36, as in the form of an SMD (surface mounted device). The device 36 has metal caps 144 which represent the electrical connections. Two nozzles 82 and 84 are disposed at a spacing from each other beneath the path of conveying movement of the circuit boards 22. As indicated by the diagrammatic arrows in FIG. 13, the liquid solder issues from the nozzles 82 and 84 in the form of a jet which extends over the entire width of the circuit boards 22. The jet impinges on the soldering eyes 142 and the caps 144, there forming the solder connections as indicated at 146. As described above, the jet of solder issues from the nozzles cyclically only when a location which needs to be suitably soldered thereby is passing.

Figure 14:
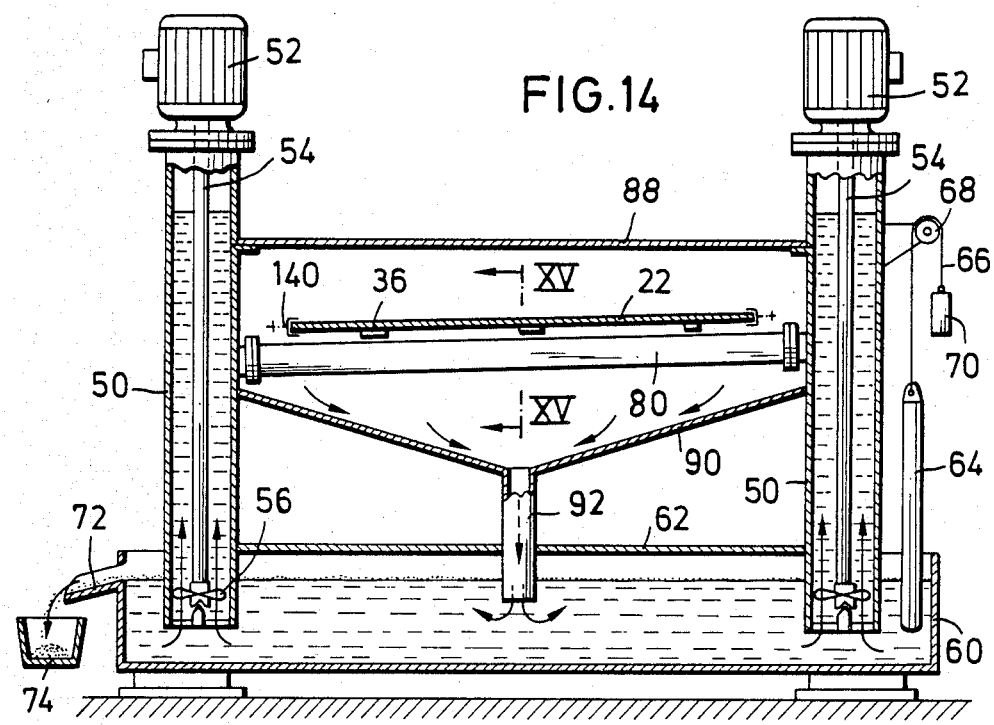
FIG. 14 is a view in section taken along line XIV—XIV in FIG. 12, showing parts which are not illustrated in FIG. 12.

The construction shown in FIG. 14 comprises a trough 60 in which the molten solder is contained. Once again, pillars or columns 50 dip into the trough 60, and carry motors 52 on the upper ends of respective ones of the pillars or columns 50. The motors 52 drive pump members 56 shown as pump wheels or impellers, by way of respective drive shafts 54. The pump members 56 urge the liquid solder upwardly in the columns 50. The trough 60 is closed upwardly by the cover member 62 while any impurities floating on the surface of the molten solder in the trough 60, as indicated by the dots thereat, are discharged into the container 74 by way of the overflow pipe 72. A piece of tin 64 is again suspended on a cable 66 which is passed around a roller 68 and connected to a counterweight 70. The piece of tin 64 is moved downwardly as the solder in the trough 60 is consumed, and melts away at its lower end where it dips into the molten solder.

Reference numeral 88 again denotes a cover plate which provides for cover over the major operation part of the apparatus. The funnel-shaped plate arrangment 90 catches any solder dripping from the circuit board 22, which then flows back into the trough 60 by way of a drain pipe 92.

Figure 15:
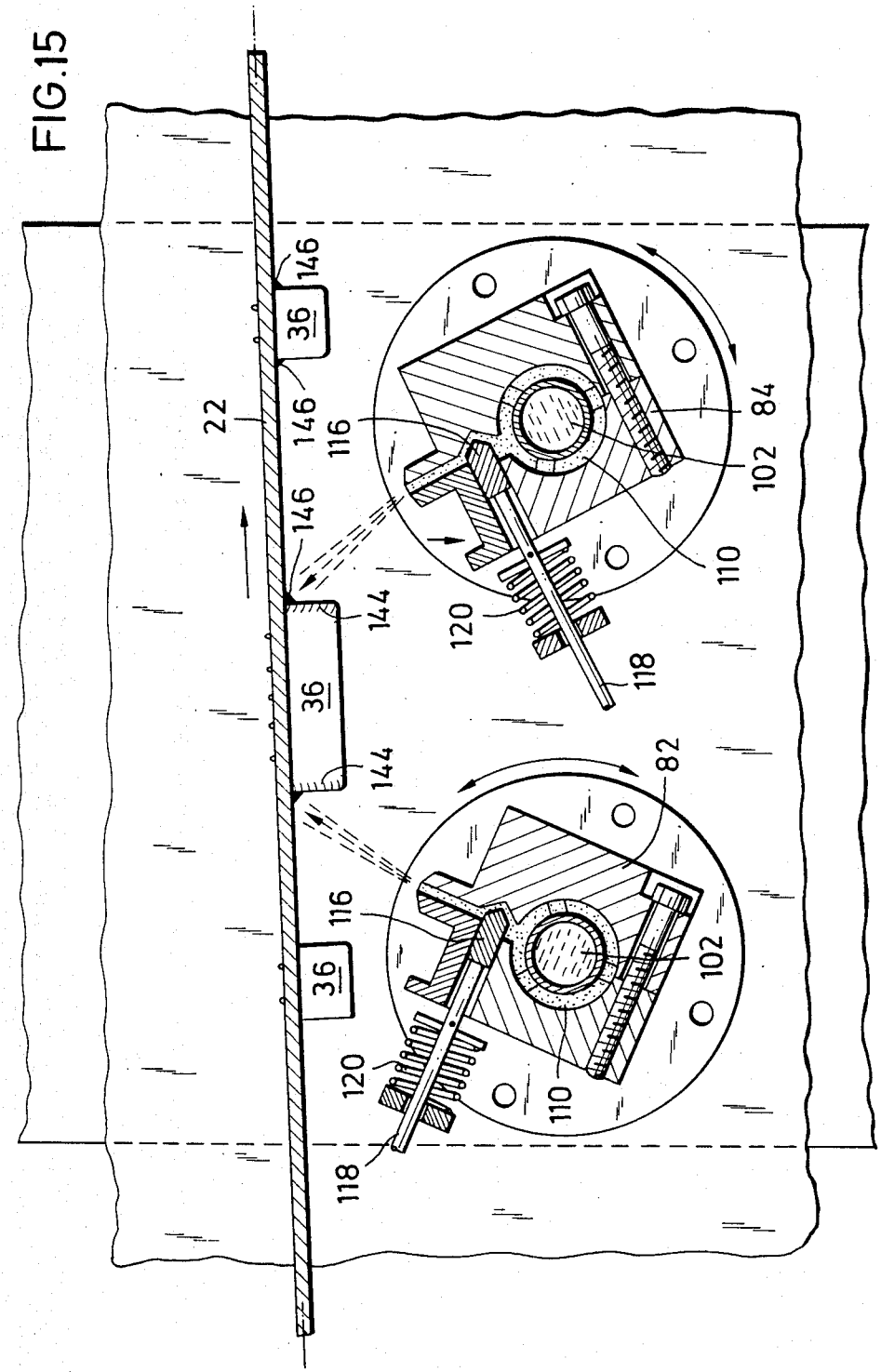
FIG. 15 is a view on an enlarged scale of the apparatus shown in FIG. 14, in section taken along line XV—XV in FIG. 14.

Referring now to FIG. 15, the two nozzles 82 and 84 have outlet openings from which the liquid solder issues in the form of a wide jet or curtain. Sliders 116 extend in a closed position into the feed conduits carrying solder to the outler openings of the nozzles 82 and 84. The sliders 116 are carried on operating rods 118 which are urged by springs 120 towards a position in which the sliders 116 close off the respective feed conduits carrying solder to the outlet openings of the nozzles. The liquid solder is supplied by way of an annular space 110 in each of the nozzle bars, the annular spaces 110 being in communication with the interior of the columns 50. Pipes 112 extend in a concentric position in each of the nozzle bars, being part of a circuit for a heating agent such as oil. That ensures that the liquid solder is held at the appropriate temperature.

FIG. 15 clearly shows that the hold solder only impinges, in the form of a jet, on the line of contact between the underneath surface of the circuit board 22 and the ends of the surface mounted device 36 which is disposed on that surface of the circuit board. Solder accumulates only the above-mentioned line of contact, thereby forming the solder joints as indicated at 146 where the metal caps 144 of the device 36 are connected to a conductor track (not specifically visible in FIG. 15). That therefore eliminates the previous fear of the device being subjected to a high level of thermal stress. As indicated by the arrows shown in FIG. 15, the two nozzles 82 and 84 may be rotated in both directions about their respective longitudinal axes, thereby making it possible to adjust the angle at which the jet of solder strikes the circuit board. It is also possible for the sliders 116 associated with the two nozzles 82 and 84 to be opened at different times. That will be the case when the length of the device 36, as considered in the direction of conveying movement of the circuit baord 22, is in such a relationship to the spacing between the two nozzles 82 and 84 that, if the two nozzles were actuated simultaneously, the jets of the solder would become excessively long or if the angles of impingement of the solder on the circuit board are unfavourable. Thus, the situation is entirely different if, instead of the large device 36 shown at the centre of FIG. 15, the two small devices 36 which are located at respective sides thereof are to be soldered to the circuit board 22.

Reference will now be made to FIG. 16 which again shows a circuit board 22 which is advanced in the direction of the arrow in FIG. 16, by a conveyor arrangement as diagrammatically indicated at 140. In other respects the structure shown in FIG. 16 corresponds to that shown in FIG. 12, as described above. The two feed pipes 78 and 80 which carry the nozzles 82 and 84 are fixed to the column 50 by holders 150. The holders 150 are such that it is possible for both liquid solder to pass into the nozzles and also for a heating agent to be circulated therein. The liquid solder and the heating agent are delivered from the column 50. FIG. 16 also shows a device 36 whose edges extend at an angle which differs from 90°, relative to the direction of movement of the circuit board 22 through the apparatus. In operation the column 50 and therewith the mounting and guide pipes 78 and 80 fixed thereto, with the nozzles, pivot about the vertical axis diagrammatically indicated at 148. For that purpose, the column 50 is actuated by a mechanical pivoting arrangement. It pivots the column 50 about its vertical axis 148 up to about a maximum of 45° in any direction. That reciprocating or oscillating movement occurs at a frequency of from about 5 to about 20 oscillations per minute. In that way, the jet of solder impinges on the line of contact between the metalliztion on the component 36 and a conductor track, at a constantly varying angle. A condition of parallelism occurs at a given moment. That means that the line of contact is subjected to the effect of the jet of solder, over its entire length, thus providing a complete soldered join between the device 36 and the circuit board. Any solder which impinges outside the line of contact drips off and/or is shaken off in the course of the further movement of the circuit board 22 through the apparatus.

In other respects the arrangement of the column 50 in FIG. 16 corresponds to the arrangement of one of the columns 50 as shown for example FIG. 5.

It will be appreciated that the above-described constructions and processes were set forth solely by way of example of the present invention and that various modifications and alternations may be made therein without thereby departing from the spirit and scope of the invention.

What is claimed is:

1. Apparatus for the continuous hot tinning of printed circuit boards, comprising: a heating station, a fluxing station, a hot tinning station, a cleaning station and a drying station; conveyor rollers for conveying said circuit boards through the apparatus, arranged approximately horizontally above and below the path of conveying movement of said circuit boards; and, at said hot tinning station, a trough for accommodating the molten tin, heating means for heating the tin in the trough, column means at respective sides of said path of conveying movement, the column means having open lower ends which dip deeply into said trough and having upper ends disposed above the level of said path of conveying movement of said circuit boards through the apparatus, nozzles arranged above and below said path of conveying movement on both sides thereof and directed towards same to apply molten tin to circuit boards passing therebetween, means connecting the inlets of said nozzles in the plane of the path of conveying movement to the column means, and pump means for pumping tin from said trough through said column means to said nozzles.

2. Apparatus as set forth in claim 1 wherein said nozzles comprise elongate nozzle bars extending over at least substantially the entire width of the path of conveying movement, wherein said nozzle bars each comprise a body portion providing a longitudinal duct therethrough and a pipe at a substantially central position therein, thereby defining an annular space therearound, wherein said column means each comprise first and second pipes disposed in mutually concentric relationship, the inner pipes being open at their lower ends and dipping into said trough and communicating with said annular spaces in said nozzle bars, and wherein the space between said first and second pipes in said respective column means is communicated with a hot oil source and with said central pipes of said nozzle bars.

3. Apparatus as set forth in claim 1 wherein said nozzles each have first outlet openings for the discharge of tin towards said circuit boards and second outlet openings for the discharge of hot air towards said circuit boards, said second outlet openings being disposed downstream of said first outlet openings in the direction of movement of said circuit boards.

4. Apparatus as set forth in claim 1 wherein each said nozzle includes a feed conduit for the feed of tin through the nozzle, and further comprising a control member adapted to be displaced between a first position of closing said feed conduit and a second position of opening said feed conduit, spring means urging said control member towards said first position, and actuator means operable to urge said control member towards said second position.

5. Apparatus as set forth in claim 4 whrein said control member is a slider and said actuator means is an electromagnetically operated actuator.

6. Apparatus as set forth in claim 1 wherein each said nozzle comprises first and second half shell members, wherein each said half shell member has a recess in its face which in the assembled position thereof faces towards a correspondingly recessed face of the other half shell member whereby in the assembled position of the half shell members said recesses define a duct within said nozzle, and screw means for holding said half shell members in said assembled condition.

7. Apparatus as set forth in claim 1 wherein said nozzles are adapted to be displaced about their respective longitudinal axes.

8. Apparatus as set forth in claim 1 wherein said nozzles are adapted to be displaced with respect to said path of conveying movement.

9. Apparatus as set forth in claim 1 wherein said nozzles comprise respective elongate nozzle bars which are each subdivided over the length thereof into a plurality of portions.

10. Apparatus as set forth in claim 9 wherein each said nozzle bar has first outlet openings for the discharge of tin and second outlet openings for the discharge of hot air, downstream of said first outlet openings, and each said nozzle bar is subdivided into a middle portion and two outer portions at respective sides of said middle portion and of narrower width than same, and further comprising respective control members for controlling the feed of tin and the supply of hot air to the respective outlet openings in each said bar portion, said control members being adapted to be actuated separately for each said bar portion.

11. Apparatus as set forth in claim 1 wherein each said conveyor roller has a hollow shaft and said hollow shafts are disposed in a coolant circuit.

12. Apparatus as set forth in claim 1 wherein said conveyor rollers and said nozzles are combined to form respective assemblies above and below said path of conveying movement, said assemblies being adapted to be adjusted in respect of their angle of inclination transversely with respect to said path of conveying movement.

13. Apparatus as set forth in claim 1 wherein said conveyor rollers are so positioned that said path of conveying movement is at a slight angle of inclination in the lengthwise direction thereof.

14. Apparatus as set forth in claim 1 wherein said column means are held in said trough and said nozzles are held between said column means, and further comprising a catch means beneath said nozzles and having a fall thereacross to provide for accumulation of nolting tin from said nozzles at a lowest part of said catch means, a drain pipe extending from said lowest part of said catch means towards said trough, a cover plate disposed above said path of conveying movement to form an upward cover means thereover, and a cover plate disposed above said trough to provide a cover means thereover.

15. Apparatus as set forth in claim 14 wherein said catch means is of a funnel-like configuration and has its said lowest part substantially at the centre thereof.

16. Apparatus as set forth in claim 1 wherein said pump means includes an electric motor on each said column means, a respective shaft mounted in each said column means and having upper and lower end portions, the upper end portion of each shaft being coupled to a respective said electric motor, and a respective pump member carried at the lower end portion of each said shaft.

17. Apparatus as set forth in claim 1 and further including means for suspending a portion of tin above said trough displaceably in respect of height relative thereto, whereby in operation of said apparatus a lower part of said portion of tin dips into the molten tin bath in said trough.

18. Apparatus as set forth in claim 1 and further including means resiliently mounting said conveyor rollers in said cleaning station, and a shaker means operatively connected to said conveyor rollers.

19. Apparatus as set forth in claim 18 wherein said shaker means is mounted on spring means and said conveyor rollers are mounted on said shaker means.

20. Apparatus as set forth in claim 1 wherein said fluxing station includes fluxing agent applicator means and further comprising blowing nozzles disposed downstream of said fluxing agent applicator means above and below said path of conveying movement, said blowing nozzles being directed towards said path of conveying movement and being operable to blow clear holes in said circuit boards.

21. Apparatus as set forth in claim 1 and further comprising downstream of said nozzles for applying tin to said circuit boards in the direction of movement thereof through the apparatus, and above and below said path of conveying movement, nozzles for spraying hot oil on to said circuit boards and nozzles for blowing fluid at a lower temperature on to said circuit boards downstream of said oil nozzles.

22. Apparatus as set forth in claim 21 wherein said fluid blowing nozzles are air blowing nozzles.

23. Apparatus as set forth in claim 21 and further including a shaker means adapted to produce a shaking movement of said circuit boards and wherein said oil and fluid blowing nozzles are disposed in said shaker means.

24. Apparatus as set forth in claim 21 and including control means adapted to provide an intermittent supply of oil and fluid to said oil and fluid blowing nozzles only when a said circuit board is passing the region of said nozzles.

25. Apparatus as set forth in claim 21 and comprising more than one pair of said oil nozzles above and below said path of conveying movement.

26. Apparatus as set forth in claim 21 and further comprising more than one pair of said fluid blowing nozzles above and below said path of conveying movement.

27. Apparatus as set forth in claim 21 wherein said fluxing station further includes nozzles having first outlet openings for fluxing agent and second outlet openings for air, and means for heating said nozzles.

28. Apparatus as set forth in claim 27 wherein said nozzles are rotatable about their respective longitudinal axes.

29. Apparatus as set forth in claim 1 wherein said column means comprises a column adapted to be pivoted about its vertical axis and further comprising a pivotal mechanism for producing pivotal movement of said column.

30. In an apparatus for the continuous hot tinning of printed circuit boards, comprising: a successive array of heating station, a fluxing station, a hot tinning station, a cleaning station, and a drying station; and conveyor means for conveying said circuit boards in an at least approximately horizontal condition through said successive array of stations, the improvement that said hot tinning station includes: a container for containing a molten tin bath; upstanding column means at at least one side of the path of conveying movement of said circuit boards provided by said conveyor means, said column means having a hollow interior and having an open lower end extending into said container and dipping into said molten tin bath therein, said column means extending upwardly to a distance such that the upper end thereof is disposed above the level of said path of conveying movement of said circuit board through the hot tinning station; first tin-spray nozzle means disposed above said path of conveying movement and having outlet opening means directed theretoward, to spray tin on to the top side of circuit boards passing through said hot tinning station; second tin-spray nozzle means disposed below said path of conveying movement and having outlet opening means directed theretowards, to spray tin on to the underside of said circuit boards passing through said hot tinning station; means connecting said first and second nozzle means to said column means at a position intermediate the upper and lower ends of said column means and providing a communciation between the hollow interior of said column means and said first and second nozzle means; and pump means operable to pump molten tin from said container through the hollow interior of said column means and to said nozzle means, for spraying of molten tin on to said circuit boards.

31. Apparatus as set forth in claim 30 wherein said nozzle means further include heating means for holding said molten tin at a temperature at which it remains molten as it passes through said nozzle means.

32. Apparatus as set forth in claim 30 and further comprising a molten tin catch means disposed below said nozzle means to catch molten tin dropping from said circuit boards and recycle said molten tin to said container.

33. Apparatus as set forth in claim 30 wherein said pump means comprises: a drive motor mounted on said column means; a shaft extending through the interior of said column means and having first and second ends, the first end being connected to said drive motor; and a pump wheel carried on said shaft at said second end thereof and positioned to be immersed in the bath of molten tin contained in said container.

34. Apparatus as set forth in claim 30 and further including means for providing a make-up supply of tin to the molten tin bath in said container.

* * * * *